US010379668B2

(12) United States Patent
Shepelev

(10) Patent No.: US 10,379,668 B2
(45) Date of Patent: Aug. 13, 2019

(54) CALIBRATING A CONTINUOUS-TIME RECEIVER FOR CAPACITIVE SENSING

(71) Applicant: SYNAPTICS INCORPORATED, San Jose, CA (US)

(72) Inventor: Petr Shepelev, Campbell, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 0 days.

(21) Appl. No.: 15/199,361

(22) Filed: Jun. 30, 2016

(65) Prior Publication Data

US 2018/0004348 A1 Jan. 4, 2018

(51) Int. Cl.
*G06F 3/041* (2006.01)
*G06F 3/044* (2006.01)

(52) U.S. Cl.
CPC ............ *G06F 3/0418* (2013.01); *G06F 3/041* (2013.01); *G06F 3/044* (2013.01)

(58) Field of Classification Search
CPC ......... G06F 3/0418; G06F 3/044; G06F 3/041
See application file for complete search history.

(56) References Cited

U.S. PATENT DOCUMENTS

| | | | |
|---|---|---|---|
| 7,911,283 B1 * | 3/2011 | Bergsma | H03K 3/017 327/36 |
| 7,920,134 B2 | 4/2011 | Krah | |
| 8,031,094 B2 | 10/2011 | Hotelling et al. | |
| 8,237,667 B2 | 8/2012 | Krah | |
| 8,279,180 B2 | 10/2012 | Hotelling et al. | |
| 8,493,330 B2 | 7/2013 | Krah | |
| 8,592,697 B2 | 11/2013 | Hotelling et al. | |
| 8,593,423 B2 | 11/2013 | Hotelling et al. | |
| 8,664,548 B2 | 3/2014 | Wilson et al. | |
| 8,791,920 B2 | 7/2014 | Krah | |
| 8,816,984 B2 | 8/2014 | Hotelling et al. | |
| 8,890,840 B2 | 11/2014 | Kuo et al. | |
| 8,913,021 B2 | 12/2014 | Elias et al. | |

(Continued)

OTHER PUBLICATIONS

International Application No. PCT/US2017/031516, International Search Report and Written Opinion dated Jul. 24, 2017, consists of 10 pages.

*Primary Examiner* — Temesghen Ghebretinsae
*Assistant Examiner* — Yaron Cohen
(74) *Attorney, Agent, or Firm* — Patterson + Sheridan, LLP

(57) ABSTRACT

Embodiments herein describe input devices that include receivers for sampling capacitive sensing signals. In one embodiment, the receivers perform continuous demodulation where the sampling of the capacitive sensing signal is not synchronized with the modulated signal applied to the sensor. To calibrate, the receiver generates first and second measurements of the capacitive sensing signal when driving a modulated signal onto one or more sensor electrodes during two respective time periods. However, the phase of at least one signal is controlled during the time periods so that the first and second measurements have a phase difference of ninety degrees. Using the first and second measurements, the receiver can determine a phase offset between the capacitive sensing signal and the modulated signal which can be used to alter future measurements so that at least some of these measurements are captured when the capacitive sensing signal is at a peak amplitude.

17 Claims, 7 Drawing Sheets

(56) References Cited

U.S. PATENT DOCUMENTS

| | | | |
|---|---|---|---|
| 9,069,408 | B2 | 6/2015 | Hotelling et al. |
| 9,086,750 | B2 | 7/2015 | Krah |
| 9,086,768 | B2 | 7/2015 | Elias et al. |
| 9,195,342 | B2 | 11/2015 | Kim et al. |
| 9,262,029 | B2 | 2/2016 | Hotelling et al. |
| 2008/0158175 | A1 | 7/2008 | Hotelling et al. |
| 2011/0193820 | A1 | 8/2011 | Chen et al. |
| 2011/0248723 | A1 | 10/2011 | Yeh et al. |
| 2012/0268397 | A1 | 10/2012 | Lee et al. |
| 2013/0285976 | A1* | 10/2013 | Kuo .................. G06F 3/044 345/174 |
| 2013/0321331 | A1 | 12/2013 | Chang |
| 2014/0049497 | A1 | 2/2014 | Krah et al. |
| 2015/0035787 | A1 | 2/2015 | Shahpamia et al. |
| 2015/0091864 | A1 | 4/2015 | Reynolds |
| 2015/0169121 | A1 | 6/2015 | Yao et al. |
| 2015/0309614 | A1 | 10/2015 | Waldron et al. |

\* cited by examiner

CALIBRATING A CONTINUOUS-TIME RECEIVER FOR CAPACITIVE SENSING

FIELD OF THE INVENTION

This invention generally relates to electronic devices and calibrating a continuous-time receiver for capacitive sensing.

BACKGROUND OF THE INVENTION

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

BRIEF SUMMARY OF THE INVENTION

One embodiment described herein is an input device that includes a plurality of sensor electrodes in a sensing region of the input device and a processing system coupled to the plurality of sensor electrodes. The processing system is configured to generate a first measurement of a capacitive sensing signal acquired using a first sensor electrode of the plurality of sensor electrodes where the capacitive sensing signal comprises effects of a modulated signal driven onto at least one of the plurality of sensor electrodes during a first time period. The processing system is configured to generate a second measurement of the capacitive sensing signal acquired using the first sensor electrode during a second time period where a phase difference between the first and second measurements is ninety degrees. The processing system is configured to determine a phase offset between the capacitive sensing signal and the modulated signal based on the first and second measurements.

Another embodiment described herein is a processing system that includes sensor circuitry configured to drive a modulated signal onto at least one sensor electrode of a plurality of sensor electrodes for capacitive sensing and a receiver configured to generate a first measurement of a capacitive sensing signal acquired using a first sensor electrode of the plurality of sensor electrodes where the capacitive sensing signal comprises effects of the modulated signal being driven onto the at least one sensor electrode during a first time period. The receiver is configured to generate a second measurement of the capacitive sensing signal acquired using the first sensor electrode during a second time period where a phase difference between the first and second measurements is ninety degrees and determine a phase offset between the capacitive sensing signal and the modulated signal based on the first and second measurements.

Another embodiment described herein is a method for performing capacitive sensing. The method includes generating a first measurement of a capacitive sensing signal acquired using a first sensor electrode of a plurality of sensor electrodes during a first time period where the capacitive sensing signal comprises effects of a modulated signal driven onto at least one of the plurality of sensor electrodes and generating a second measurement of the capacitive sensing signal acquired using the first sensor electrode during a second time period where a phase difference between the first and second measurements is ninety degrees. The method also includes determining a phase offset between the capacitive sensing signal and the modulated signal based on the first and second measurements.

Figure 1:
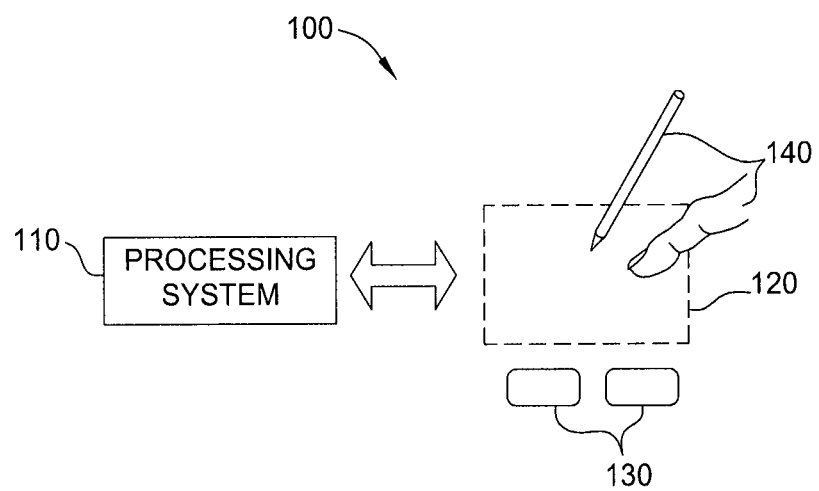
FIG. 1 is a block diagram of an exemplary system that includes an input device in accordance with an embodiment described herein.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

The following detailed description is merely exemplary in nature and is not intended to limit the disclosure or its application and uses. Furthermore, there is no intention to be bound by any expressed or implied theory presented in the preceding technical field, background, brief summary or the following detailed description.

Various embodiments of the present invention provide input devices and methods that facilitate improved usability. Embodiments herein describe input devices that include receivers for sampling capacitive sensing signals. In one embodiment, the receivers perform continuous demodulation where the sampling of the capacitive sensing signal is not synchronized with the modulated signal applied to the sensor. One advantage of using continuous demodulation is that functions in the receiver that used to be performed using analog components can now be replaced by digital logic. For example, instead of including large capacitors for performing low pass filtering, this filtering can be performed by digital logic thereby reducing the size, cost, and/or power consumption of the receivers.

However, one disadvantage of not synchronizing the receiver to the modulated signal is that measurements (or samples) captured by the receiver are dependent on the phase delay of the sensor electrode. This phase delay can cause the modulated signal to have a phase offset relative to the capacitive sensing signal at the receiver. As such, the peak of the modulated signal is offset relative to a peak of the capacitive sensing signal. If the receiver does not sample at the peaks (i.e., the greatest amplitude) of the capacitive sensing signal, the accuracy of capacitive sensing may be negatively impacted.

To calibrate the receiver, in one embodiment, the receiver measures or samples the capacitive sensing signal during two time periods. During a first time period, the receiver generates a first measurement (or sample) of the capacitive sensing signal that corresponds to a first sensor electrode. During a second time period, the receiver generates a second measurement of the capacitive sensing signal for the same sensor electrode, but the phase difference between the first and second measurements is ninety degrees (i.e., $\pi/2$). To achieve this phase difference, the input device can phase shift a sampling signal used to control when the first and second measurements are captured by ninety degrees, or the input device can phase shift the modulated signal by ninety degree during the first and second time periods.

Using the first and second measurements, the receiver can determine a phase offset between the capacitive sensing signal and the modulated signal. This phase offset can be used to alter future measurements generated by the input device so that at least some of these measurements are captured when the capacitive sensing signal is at a peak amplitude. Moreover, in one embodiment, the input device can use the two measurements to estimate the peak amplitude of the capacitive sensing signal even if the two measurements where captured when the capacitive sensing signal was not at its peak amplitude.

Turning now to the figures, FIG. 1 is a block diagram of an exemplary input device 100, in accordance with embodiments of the invention. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include I²C, SPI, PS/2, Universal Serial Bus (USB), Bluetooth, RF, and IRDA.

In FIG. 1, the input device 100 is shown as a proximity sensor device (also often referred to as a "touchpad" or a "touch sensor device") configured to sense input provided by one or more input objects 140 in a sensing region 120. Example input objects include fingers and styli, as shown in FIG. 1.

Sensing region 120 encompasses any space above, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g. a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100.

The input device 100 may utilize any combination of sensor components and sensing technologies to detect user input in the sensing region 120. The input device 100 comprises one or more sensing elements for detecting user input. As several non-limiting examples, the input device 100 may use capacitive, elastive, resistive, inductive, magnetic, acoustic, ultrasonic, and/or optical techniques.

Some implementations are configured to provide images that span one, two, three, or higher dimensional spaces. Some implementations are configured to provide projections of input along particular axes or planes.

In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensing elements pick up loop currents induced by a resonating coil or pair of coils. Some combination of the magnitude, phase, and frequency of the currents may then be used to determine positional information.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g. system ground), and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g. other electromagnetic signals). Sensor electrodes may be dedicated transmitters or receivers, or may be configured to both transmit and receive.

In FIG. 1, a processing system 110 is shown as part of the input device 100. The processing system 110 is configured to operate the hardware of the input device 100 to detect input in the sensing region 120. The processing system 110 comprises parts of or all of one or more integrated circuits (ICs) and/or other circuitry components. For example, a processing system for a mutual capacitance sensor device may comprise transmitter circuitry configured to transmit signals with transmitter sensor electrodes, and/or receiver circuitry configured to receive signals with receiver sensor electrodes). In some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g. to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120, or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of an active area of a display screen. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As another example, the display screen may be operated in part or in total by the processing system 110.

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system 110). Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2:
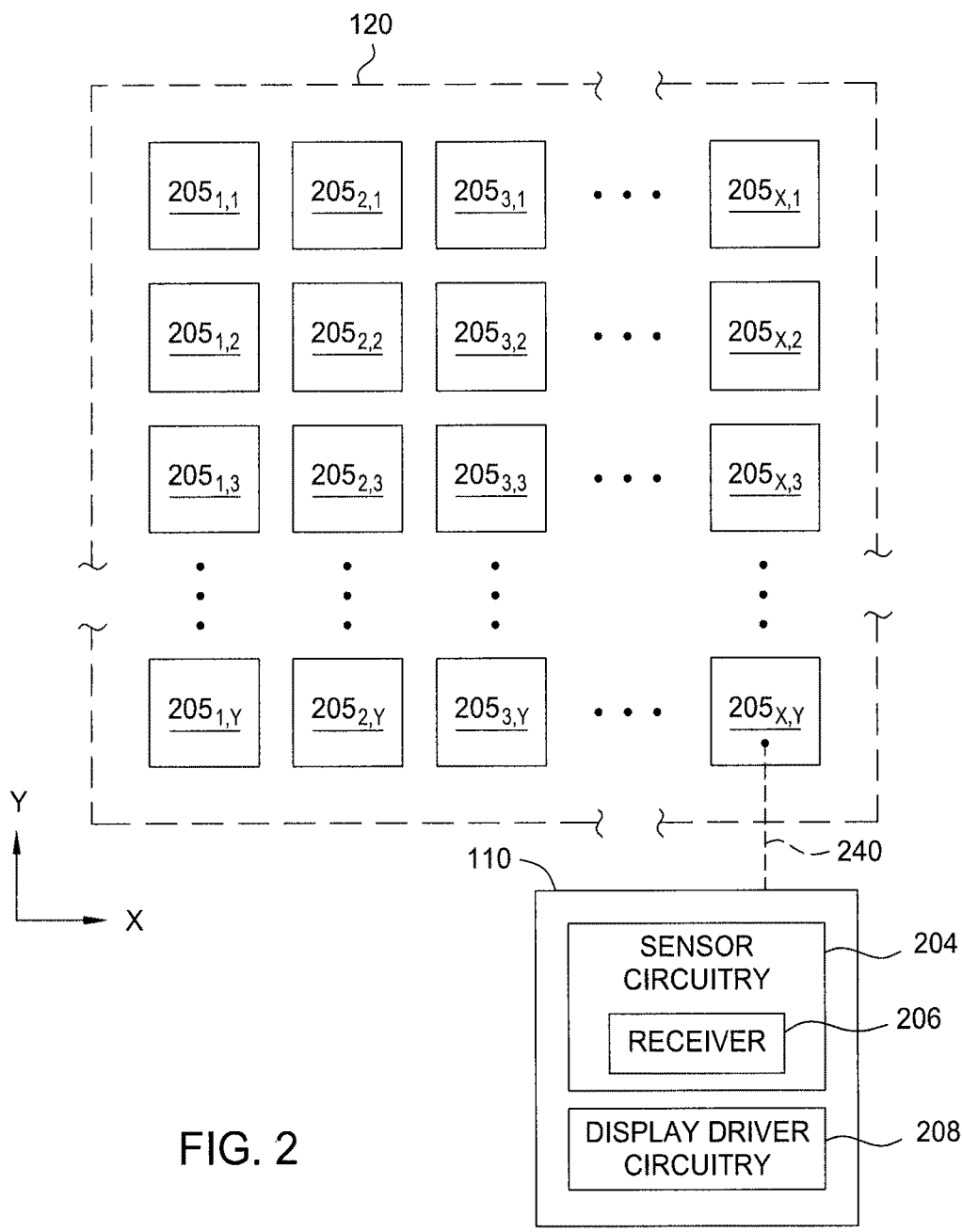
FIG. 2 illustrates portions of exemplary patterns of capacitive sensing pixels in accordance with an embodiment described herein.

FIG. 2 shows a portion of an exemplary pattern of capacitive sensing pixels 205 (also referred to herein as capacitive pixels or sensing pixels) configured to sense in the sensing region 120 associated with a pattern, according to some embodiments. Each capacitive pixel 205 may include one of more of the sensor electrodes described above. For clarity of illustration and description, FIG. 2 presents the regions of the capacitive pixels 205 in a pattern of simple rectangles and does not show various other components within the capacitive pixels 205. In one embodiment, the capacitive sensing pixels 205 are areas of localized capacitance (capacitive coupling). Capacitive pixels 205 may be formed between an individual sensor electrode and ground in a first mode of operation and between groups of sensor electrodes used as transmitter and receiver electrodes in a second mode of operation. The capacitive coupling changes with the proximity and motion of input objects in the sensing region 120 associated with the capacitive pixels 205, and thus may be used as an indicator of the presence of the input object in the sensing region 120 of the input device.

The exemplary pattern (e.g., a matrix forming a rectangular array) comprises an array of capacitive sensing pixels $205_{X,Y}$ (referred collectively as pixels 205) arranged in X columns and Y rows in a common plane, wherein X and Y are positive integers, although one of X and Y may be zero. It is contemplated that the pattern of sensing pixels 205 may comprises a plurality of sensing pixels 205 having other configurations, such as polar arrays, repeating patterns, non-repeating patterns, non-uniform arrays a single row or column, or other suitable arrangement. Further, as will be discussed in more detail below, the sensor electrodes in the sensing pixels 205 may be any shape such as circular, rectangular, diamond, star, square, noncovex, convex, non-concave concave, etc. As shown here, the sensing pixels 205 are coupled to the processing system 110.

In a first mode of operation, at least one sensor electrode within the capacitive sensing pixels 205 may be utilized to detect the presence of an input object via absolute sensing techniques. Sensor circuitry 204 in processing system 110 is configured to drive a sensor electrode using a trace 240 in each pixel 205 with a modulated or unmodulated signal and measure a capacitance between the sensor electrode and the input object (e.g., free space or earth ground) based on the driven signal, which is utilized by the processing system 110 or other processor to determine the position of the input object or features in a finger. In one embodiment, the sensor circuitry 204 is part of a larger module in the processing system 110 that may include firmware for performing the functions described herein. Moreover, the module containing the sensor circuitry 204 may include additional circuitry or firmware for performing different functions than the ones recited herein.

The various electrodes of capacitive pixels 205 are typically ohmically isolated from the electrodes of other capacitive pixels 205. Additionally, where a pixel 205 includes multiple electrodes, the electrodes may be ohmically isolated from each other. That is, one or more insulators separate the sensor electrodes and prevent them from electrically shorting to each other.

In a second mode of operation, sensor electrodes in the capacitive pixels 205 are utilized to detect the presence of an input object via transcapacitance sensing techniques. That is, processing system 110 may drive at least one sensor electrode in a pixel 205 with a transmitter signal and receive resulting signals using one or more of the other sensor electrodes in another pixel 205, where a resulting signal comprising effects corresponding to the transmitter signal. The resulting signal is utilized by the processing system 110 or other processor to determine the position of the input object.

The input device 100 may be configured to operate in any one of the modes described above. The input device 100 may also be configured to switch between any two or more of the modes described above.

In some embodiments, the capacitive pixels 205 are "scanned" to determine these capacitive couplings. That is, in one embodiment, one or more of the sensor electrodes are driven to transmit transmitter signals. Transmitters may be operated such that one transmitter electrode transmits at one time, or multiple transmitter electrodes transmit at the same time. Where multiple transmitter electrodes transmit simultaneously, the multiple transmitter electrodes may transmit the same transmitter signal and effectively produce an effectively larger transmitter electrode. Alternatively, the multiple transmitter electrodes may transmit different transmitter signals. For example, multiple transmitter electrodes may transmit different transmitter signals according to one or more coding schemes that enable their combined effects on the resulting signals of receiver electrodes to be independently determined.

The sensor electrodes configured as receiver sensor electrodes may be operated singly or multiply to acquire resulting signals. The resulting signals may be used to determine measurements of the capacitive couplings at the capacitive pixels 205.

In other embodiments, "scanning" pixels 205 to determine these capacitive coupling includes driving with a modulated signal and measuring the absolute capacitance of one or more of the sensor electrodes. In another embodiment, the sensor electrodes may be operated such that the modulated signal is driven on a sensor electrode in multiple capacitive pixels 205 at the same time. In such embodiments, an absolute capacitive measurement may be obtained from each of the one or more pixels 205 simultaneously. In one embodiment, the input device 100 simultaneously drives a sensor electrode in a plurality of capacitive pixels 205 and measures an absolute capacitive measurement for each of the pixels 205 in the same sensing cycle. In various embodiments, processing system 110 may be configured to selectively drive and receive with a portion of sensor electrodes. For example, the sensor electrodes may be selected based on, but not limited to, an application running on the host processor, a status of the input device, an operating mode of the sensing device and a determined location of an input object. In another embodiment, the input object (e.g., a finger) is the transmitter that is driven with the modulated signal while the sensor electrode is a receiver.

A set of measurements from the capacitive pixels 205 form a capacitive image (also capacitive frame) representative of the capacitive couplings at the pixels 205 as discussed above. Multiple capacitive images may be acquired over multiple time periods, and differences between them used to derive information about input in the sensing region. For example, successive capacitive images acquired over successive periods of time can be used to track the motion(s) of one or more input objects entering, exiting, and within the sensing region.

In some embodiments, one or more of the sensor electrodes in the capacitive pixels 205 include one or more display electrodes used in updating the display of the display screen. In one or more embodiments, the display electrodes comprise one or more segments of a Vcom electrode (common electrodes), a source drive line, gate line, an anode electrode or cathode electrode, or any other display element. These display electrodes may be disposed on an appropriate display screen substrate. For example, the electrodes may be disposed on the a transparent substrate (a glass substrate, TFT glass, a plastic substrate or any other transparent material) in some display screens (e.g., In Plane Switching (IPS) or Plane to Line Switching (PLS) Organic Light Emitting Diode (OLED)), on the bottom of the color filter glass of some display screens (e.g., Patterned Vertical Alignment (PVA) or Multi-domain Vertical Alignment (MVA)), over an emissive layer (OLED), etc. In such embodiments, an electrode that is used as both a sensor and a display electrode can also be referred to as a combination electrode, since it performs multiple functions.

Continuing to refer to FIG. 2, the processing system 110 coupled to the sensor electrodes includes a circuitry 204 and optionally, display driver circuitry 208. In one embodiment the sensor circuitry 204 drives a transmitter signal onto and receives resulting signals with the sensor electrodes during periods in which input sensing is desired. In one embodiment the sensor circuitry 204 includes a transmitter module including circuitry configured to drive a transmitter signal onto the sensor electrodes during periods in which input sensing is desired. The transmitter signal is generally modulated and contains one or more bursts over a period of time allocated for input sensing. The transmitter signal may have an amplitude, frequency and voltage which may be changed to obtain more robust location information of the input object in the sensing region. The modulated signal used in absolute capacitive sensing may be the same or different from the transmitter signal used in transcapacitance sensing. The sensor circuitry 204 may be selectively coupled to one or more of the sensor electrodes in the capacitive pixels 205. For example, the sensor circuitry 204 may be coupled to selected portions of the sensor electrodes and operate in either an absolute or transcapacitance sensing mode. In another example, the sensor circuitry 204 may be coupled to different sensor electrodes when operating in the absolute sensing mode than when operating in the transcapacitance sensing mode.

In various embodiments the sensor circuitry 204 may comprise a receiver 206 that includes circuitry configured to receive a resulting signal (e.g., a capacitive sensing signal) with the sensor electrodes comprising effects corresponding to the transmitter signal during periods in which transcapacitive sensing is performed. Here, a portion of the sensor circuitry 204 is coupled to a transmitter electrode and drives the transmitter signal while the receiver 206 is coupled to a receiver electrode and receives the resulting signal comprising effects of the transmitter signal. In one or more embodiments, the receiver 206 is configured to drive a modulated signal onto a first sensor electrode in one of the pixels 205 and measure a capacitive sensing signal corresponding to the modulated signal to determine changes in absolute capacitance of the sensor electrode. The receiver 206 may determine a position of the input object in the sensing region 120 or may provide a signal including information indicative of the resulting signal to another module in the processing system 110 or processor, for example, a processor of the electronic device (i.e., a host processor), for determining the position of the input object in the sensing region 120. In one or more embodiments, the receiver 206 comprises a plurality of receivers, where each receiver may be an analog front ends (AFEs). Although shown as being part of the sensor module 204, the receiver 206 may be separate from the sensor module 204. For example, the sensor module 204 may drive a modulated signal onto one of the sensor electrodes (e.g., a transmitter electrode) while the receiver 206 is coupled to a receiver electrode.

In one or more embodiments, capacitive sensing (or input sensing) and display updating may occur during at least partially overlapping periods. For example, as a combination electrode is driven for display updating, the combination electrode may also be driven for capacitive sensing. Or overlapping capacitive sensing and display updating may include modulating the reference voltage(s) of the display device and/or modulating at least one display electrode for a display in a time period that at least partially overlaps with when the sensor electrodes are configured for capacitive sensing. In another embodiment, capacitive sensing and display updating may occur during non-overlapping periods, also referred to as non-display update periods. In various embodiments, the non-display update periods may occur between display line update periods for two display lines of a display frame and may be at least as long in time as the display update period. In such embodiment, the non-display update period may be referred to as a long horizontal blanking period, long h-blanking period or a distributed blanking period. In other embodiments, the non-display update period may comprise horizontal blanking periods and vertical blanking periods. Processing system 110 may be configured to drive sensor electrodes for capacitive sensing during any one or more of or any combination of the different non-display update times.

The display driver circuitry 208 includes circuitry configured to provide display image update information to the display of the display device during non-sensing (e.g., display updating) periods. In one embodiment, the display driver circuitry 208 may be part of a larger module that can include firmware for performing the display functions described herein. The display driver circuitry 208 may be included with or separate from the sensor module 204. In one embodiment, the processing system comprises a first integrated controller comprising the display driver circuitry 208 and at least a portion of the sensor module 204 (i.e., transmitter module and/or receiver module). In another embodiment, the processing system comprises a first integrated controller comprising the display driver circuitry 208 and a second integrated controller comprising the sensor module 204. In yet another embodiment, the processing system comprises a first integrated controller comprising a display driver circuitry 208 and one of a transmitter module or a receiver module and a second integrated controller comprising the other one of the transmitter module and receiver module.

Figure 3:
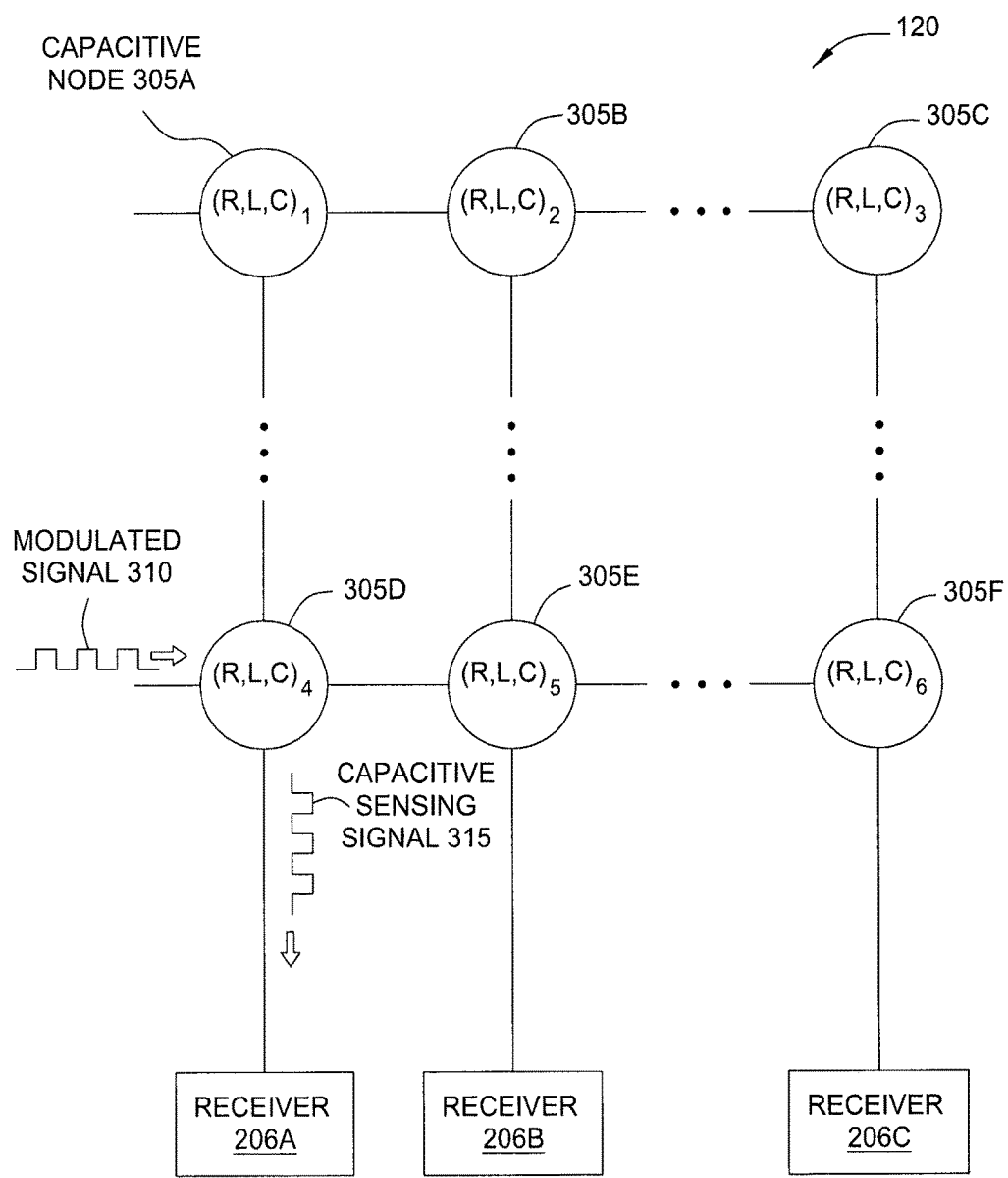
FIG. 3 illustrates an impedance network for a sensing region in accordance with an embodiment described herein.

FIG. 3 illustrates an impedance network for a sensing region 120 in accordance with an embodiment described herein. As shown, the sensing region 120 includes a capacitive sensor represented as a network of resistive (R), inductive (L), and capacitive (C) values. The region 120 can take on any shape—rectangular, diamond, circular, etc. Moreover, the sensing region 120 includes a plurality of capacitive nodes 305 which may be defined by the shape and location of respective sensor electrodes in the sensing region 120. Each capacitive node 305 may have different resistive, inductive, and capacitive (R, L, C) values than each of the other nodes 305 in the region 120.

As shown, a modulated signal 310 affects the capacitive nodes which results in a capacitive sensing signal 315. Stated differently, the capacitive sensing signal 315 comprises effects of driving the modulated signal 310 onto one or more of the sensor electrodes in the region 120. If performing transcapacitance sensing, the modulated signal 310 is driven onto a first sensor electrode which generates the capacitive sensing signal 315 on a second sensor electrode that is capacitively coupled to the first sensor electrode. For example, the modulated signal 310 may be a transmitter signal driven on a transmitter electrode on a first layer in the input device while the capacitive sensing signal is a resulting signal received on a receiver electrode on a second layer of the input device.

Figure 4:
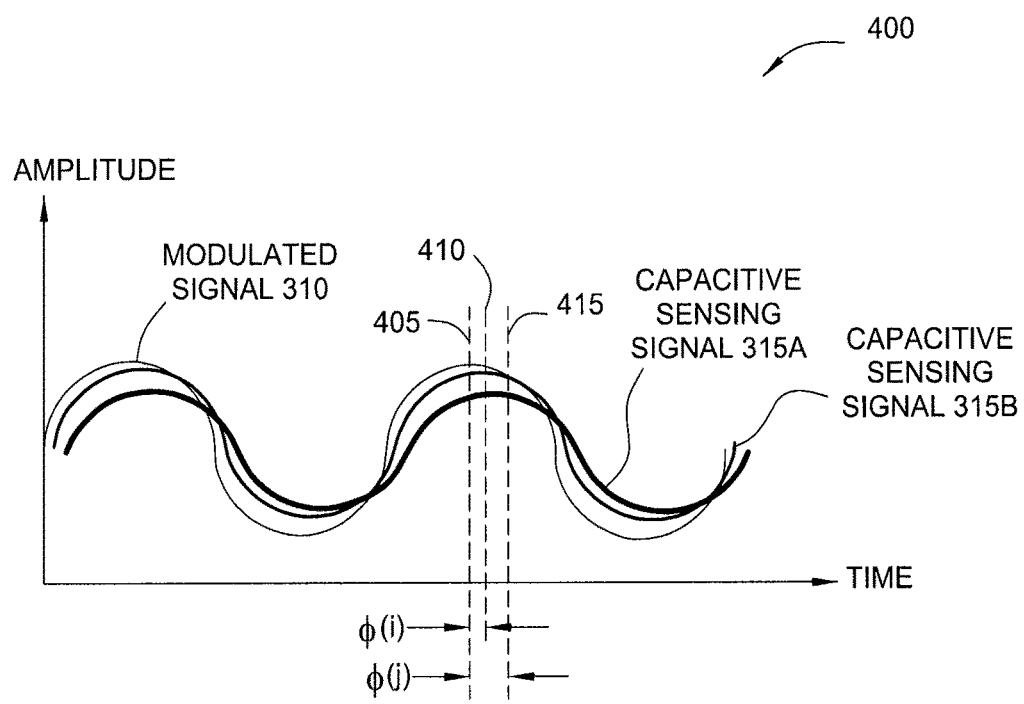
FIG. 4 illustrates phase offset between a modulated signal and capacitive sensing signals in accordance with an embodiment described herein.

However, if performing absolute capacitive sensing, the modulated signal 310 may be applied by the receiver 206 (e.g., at terminal to an integrator) which modulates the sensor electrode and enables the receiver 206 to measure the capacitive sensing signal 315 corresponding to that sensor electrode. FIG. 4 is drawn generically to illustrate the effects of the R, L, C network when performing either transcapacitive or absolute capacitive sensing.

Each capacitive node 305 has a shape defined by an outline of a sensor electrode where the receivers 206 can measure an individual measurement of capacitance at a particular location in space in order to calculate a location of one or more input objects. For example, the capacitive nodes 305 can be defined by a crossing between a transmitter and receiver electrode or a physical outline of sensor electrode used for absolute capacitance sensing. Because the R, L, C values for each capacitive node 305 may be different, this means the relative phase offset between the modulated signal 310 and the capacitive sensing signal 315 may be different. That is, the values of R, L, C at each node 305 can alter the phase and amplitude for each capacitive sensing signal 315 relative to the modulated signal 310.

FIG. 4 illustrates phase offset between the modulated signal 310 and capacitive sensing signals in accordance with an embodiment described herein. Chart 400 illustrates the phase offset φ between two capacitive sensing signals 315A and 315B generated at two different capacitive nodes 305 shown in FIG. 3. In this example, the same modulated signal 310 is used to generate the two capacitive sensing signals 315A and 315B. Because the R, L, C values for the two capacitive nodes 305 are different, the respective phase offset between the capacitive sensing signals 315 and the modulated signal 310 are different.

The dotted vertical line 405 illustrates the positive peak of the modulated signal 310 while line 410 and line 415 illustrate the positive peaks of capacitive sensing signals 315A and 315B, respectively. As shown, the capacitive sensing signals 315 have a similar shape as the modulated signal 310 but with different amplitudes and phase delays. The receivers 206 shown in FIG. 3 sample different points of the capacitive sensing signals 315 to generate capacitive sensing measurements. However, where the receivers 206 sample the capacitive sensing signals 315A and 315B can affect the amount of signal measured. For example, if the receiver 206 samples the capacitive sensing signals 315A and 315 at the time illustrated by line 405, the signals 315A and 315B are not at their peaks, and thus, the amount of signal measured is less than what would be measured during the times corresponding to the lines 410 and 415 when the capacitive sensing signals 315A and 315B are at their peaks.

Chart 400 illustrates that different capacitive nodes 305 can have different phase offsets relative to the modulated signal 310. For example, the modulated signal 310 may be driven on one transmitter electrode which then results in the capacitive sensing signals 315A and 315B on two receiver electrodes. Because the receiver electrodes can have different R, L, C values, the phase offset for the capacitive sensing signals 315A and 315B relative to the modulated signal 310 are different. Further, the R, L, C values for the capacitive nodes 305 may change or drift based on, for example, temperature fluctuations. Ideally, the receiver can identify the phase offset and sample when the capacitive sensing signals 315A and 315B are at their local maximum and minimum.

Figure 5:
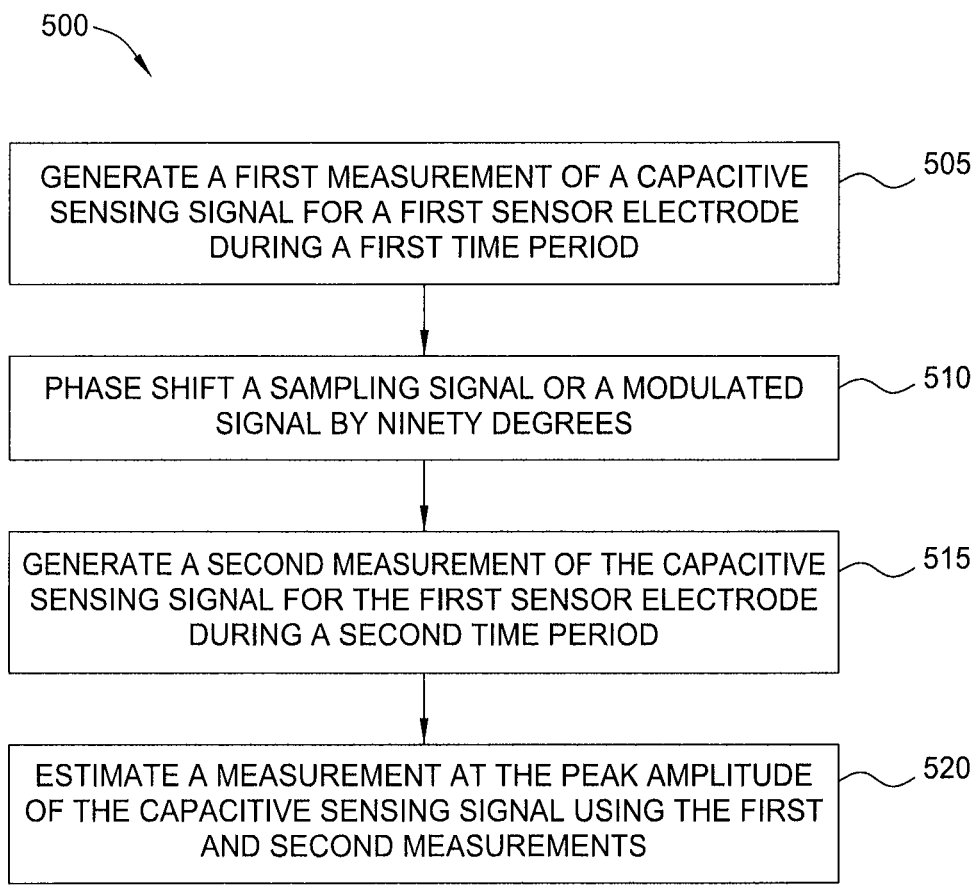
FIG. 5 is a flow chart for generating a capacitive sensing measurement using phase shifted signals in accordance with an embodiment described herein.

FIG. 5 is a flow chart of a method 500 for generating a capacitive sensing measurement using phase shifted signals in accordance with an embodiment described herein. For clarity, the blocks in method 500 are discussed in parallel to FIG. 6 which illustrates a receiver 206 for generating a capacitive sensing measurement using phase shifted signals in accordance with an embodiment described herein.

At block 505, a receiver generates a first measurement of a capacitive sensing signal for a first sensor electrode during a first time period. Although not shown in FIG. 6, a modulated signal is driven on a sensor electrode (either sensor electrode 605 or a transmitter electrode) which results in the capacitive sensing signal 315 which is received at a sampler 615. The sampler 615 receives an input from a phase shifter 620 which can delay the phase of a sampling signal 610 provided to the receiver 206. In one embodiment, the sampling signal 610 is a timing signal generated in the processing system which instructs the sampler 615 when to capture a capacitive sensing measurement (or sample) of the capacitive sensing signal 315.

If the receiver 206 was synchronized with the capacitive sensing signal 315, the sampling times could be synched to the peaks (maximums) and valleys (minimums) of the capacitive sensing signal 315. However, when performing continuous demodulation where the receiver 206 is not synchronized, the sampling signal 610 may be at a higher frequency than the capacitive sensing signal 315 so that the sampler 615 captures measurements at other locations of the waveform of the capacitive sensing signal 315—i.e., not only at the peaks and valleys. To maximize the amount of signal, the embodiments herein provide techniques for phase shifting the sampling signal 610 such that the sampler 615 generates measurements corresponding to the maximum amplitude of the capacitive sensing signal 315. To do so, the receiver 206 (or other circuitry or firmware in the processing system) calculates a phase offset between the modulated signal and capacitive sensing signal 315 which the phase shifter 620 can use so that future measurements are captured when the capacitive sensing signal 315 is at peaks and valleys.

After capturing the first measurement of the capacitive sensing signal 315, the processing system phase shifts the sampling signal 610 or the modulated signal by ninety degrees relative to the phase of these signals during the first time period. In the example shown in FIG. 6, once the first measurement is captured, the phase shifter 620 can phase shift the sampling signal 610 by ninety degrees relative to the phase of the sampling signal 610 during the first time period. Alternatively, instead of shifting the phase of the sampling signal 610, a driver in the processing system (if transcapacitive sensing is being performed) or the receiver 206 (if absolute capacitance sensing is performed) can phase shift the modulated signal by ninety degrees relative to the phase of the modulated signal during the first time period. Phase shifting the modulated signal also phase shifts the capacitive sensing signal 315 by ninety degrees.

At block 515, the sampler 615 in the receiver 206 generates a second measurement of the capacitive sensing signal for the first sensor electrode 605 during a second time period. As a result of the phase shift performed at block 510, the phases of the first and second measurements are off by a phase difference of ninety degrees. Although method 500 illustrates capturing the first and second measurements using two different time periods, similar measurements could occur by using two different receivers which both receive the same capacitive sensing signal 315. In this case, the first and second measurements could be obtained in parallel. However, doing so may require duplicate hardware (e.g., two receivers rather than one) which can increase the cost of the input device. Instead, by using two time periods, only one receiver 206 is used. So long as the first and second time periods are taken close together, the R, L, C values for the sensor electrode 605 are substantially the same.

In one embodiment, the first and second time periods are consecutive capacitive sensing bursts in the same capacitive frame (or capacitive image). Each capacitive sensing burst may include a predefined number of cycles of the modulated signal (e.g., five cycles of the modulated signal) used to generate a single measurement for a capacitive node or sensor electrode in the sensing region. In this example, the first measurement is captured during a first capacitive sensing burst while the second measurement is captured during the next subsequent sensing burst. Alternatively, the first and second measurements may be obtained using capacitive sensing bursts in sequential capacitive frames. Although this means the first and second time periods are separated by a greater time period, the R, L, C values which determine the phase offset corresponding to sensor electrode 605 typically do not change substantially between two consecutive capacitive frames. Thus, the first and second measurements are very similar but with a ninety degree phase difference.

A harmonic of the capacitive sensing signal 315 can be represented as follows:

$$S_i = \sin(\omega t + \phi(i,t)) = \sin(\omega t)\cos(\phi(i,t)) + \cos(\omega t) + \sin(\phi(i,t)) \quad (1)$$

Equation 1 represents the harmonic of the capacitive sensing signal 315 in its in-phase and an out-of-phase (quadrature) parts of a signal. When the in-phase part is at its maximum, the quadrature part is at its minimum, and vice versa. Time t can denote a discrete moment in time (or continuous time), depending on the receiver 206. Moreover, $\omega t$ represents the sampling frequency used to sample the signal 315 while $\phi$ is the demodulation rate. Because $\phi(i, t)$ for the different capacitive sensing signals for the different capacitive nodes can be different, the receivers coupled to the nodes can measure different amplitudes of the samples which results in a dependency of the gain of the receivers on phase as illustrated in FIG. 4.

Using the first and second measurements, the receiver 206 can estimate an actual value of $\phi(i, t)$ and thus, measure a full amplitude A(i) for each capacitive sensing signal i. The first and second measurements (when taken close in time) provide in-phase and quadrature data so the following assumptions are true:

$$\phi(i,t_1) = \phi(i,t_2) = \phi(i) \quad (2)$$

$$|\Delta\phi(i,t_1) - \Delta\phi(i,t_2)| = \pi/2 \quad (3)$$

Because the R, L, C values for sensor electrode 605 do not change substantially between the first and second time periods, the $\phi$ values for the two measurements are the same as shown in Equation 2. In Equation 3, because the sampling signal or the modulated signal were phase shifted by ninety degrees when taking the second measurements, subtracting the change in the values between the two time periods is ninety degrees—i.e., $\pi/2$. As a result, the full amplitude (A) of the capacitive sensing signal 315 can be estimated using the following:

$$\tilde{A} = \sqrt{S_i(t_1, \Delta\phi(i,t_1))^2 + S_i(t_2, \Delta\phi(i,t_2))^2} \quad (4)$$

In this example, $S_i(t_1, \Delta\phi(i, t_1)$ represents the first measurement taken during the first time period while $S_i(t_2, \Delta\phi(i, t_2)$ represents the second measurement taken during the second time period.

At block 520, the receiver 260 estimates a measurement at the peak amplitude of the capacitive sensing signal 315 using the first and second measurements. Using Equation 4, even if the sampler 615 did not generate a measurement when the amplitude of the capacitive sensing signal 315 is at a maximum, the first and second measurements can be processed to yield the peak amplitude of the signal 315. Stated differently, because of the relationships shown in Equation 2 and 3, the receiver 206 can generate a measurement using Equation 4 that is an estimate of the measurement that would have been obtained if the sampler 615 had captured a measurement at the peak amplitude of the capacitive sensing signal 315. In this manner, the receiver 206 (or other logic in the processing system) can perform post processing on the first and second measurements to determine the measurement corresponding to the peak amplitude of the signal 315.

Figure 7:
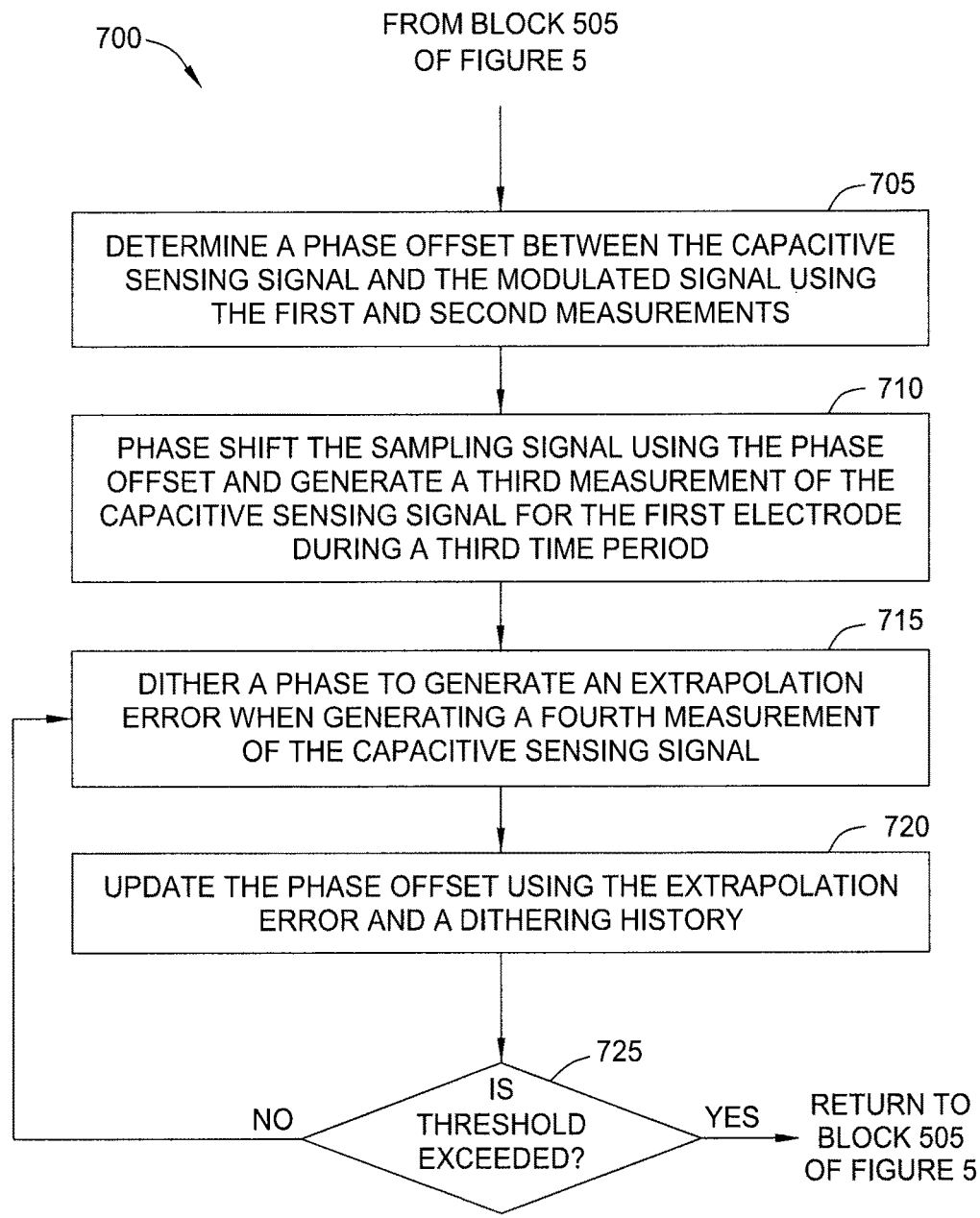
FIG. 7 is a flow chart for determining a phase offset between the modulated signal and capacitive sensing signals for each sensor electrode in accordance with an embodiment described herein.

FIG. 7 is a flow chart of a method 700 for determining a phase offset between the modulated signal and capacitive sensing signals for a sensor electrode in accordance with an embodiment described herein. In this embodiment, method 700 begins after block 515 of FIG. 5 has been performed and the receiver 206 has captured first and second measurements with a phase difference of ninety degrees. In another embodiment, the method 700 may begin after block 520 where the processing system estimates the measurement corresponding to the peak amplitude of the capacitive processing system.

Figure 6:
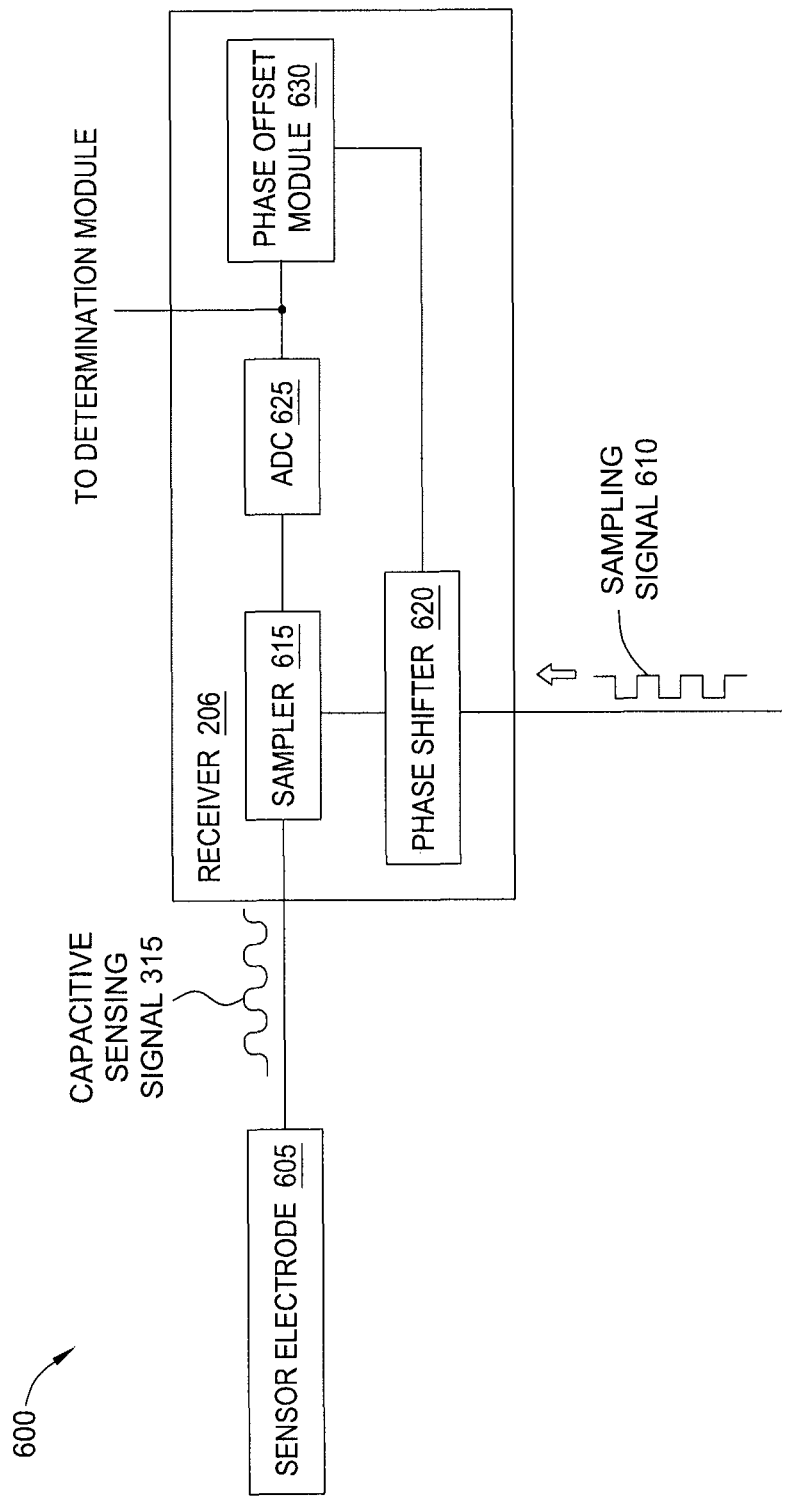
FIG. 6 is receiver for generating a capacitive sensing measurement using phase shifted signals in accordance with an embodiment described herein.

At block 705, the receiver determines the phase offset between the capacitive sensing signal and the modulated signal using the first and second measurements to calibrate the receiver for future capacitive sensing measurements. As shown in FIG. 6, the receiver 206 includes a phase offset module 630 which is coupled to an output of an analog digital converter (ADC) 625. For example, after the sampler 615 measures the first and second measurements, the ADC 625 transmits the digital representation of these measurements to the phase offset module 630 to determine the phase offset. The output of the ADC 625 can be used by the processing system to determine the location of an input object based on sampling the capacitive sensing signal 315.

The phase offset module 630 determines the phase offset between the capacitive sensing signal 315 and the modulated signal. That is, the phase offset module 630 determines the phase offsets φ shown in FIG. 4 between each capacitive sensing signal 315 and the respective modulated signal. Because the phase of the driving waveform—i.e., the modulated signal—is known, the phase offset can be calculated using the following:

$$\hat{\phi}_I(t_2+T)=\tilde{\phi}_I+(\phi(i,t_2+T)-\phi(i,t_2)) \quad (5)$$

In equation 5, $\hat{\phi}$ represents the phase offset between the capacitive sensing signal 315 and the modulated signal. Moreover, $\tilde{\phi}_I$ represents an estimate of the phase of the modulated signal. Performing the calculation indicated in Equation 5, the phase offset module 630 can determine the appropriate phase shift for the sampling signal 610 that ensures at least one sample is captured when the capacitive sensing signal 315 is at its peak amplitude. In one example, the phase offset module 630 transmits the phase offset $\hat{\phi}$ to the phase shifter 620 which shifts the sampling signal 610 such that sampler 615 captures a measurement of the capacitive sensing signal 315 at its peak. Of course, because the frequency of the sampling signal 610 may be faster than the capacitive sensing signal 315 and the modulated signal, the sampler 615 may generate other measurements or samples of the capacitive sensing signal 315 other than at its peak amplitude. Nonetheless, the techniques described herein permit the receiver to identify the phase offset caused by the R, L, C values of each capacitive node and compensate for this offset by phase shifting the sampling signal 610.

At block 710, the receiver phase shifts the sampling signal using the phase offset and generates a third measurement of the capacitive sensing signal for the first electrode 605 during a third time period. For example, once the phase offset module 630 determines the phase offset $\hat{\phi}$, for a subsequent capacitive sensing burst, the receiver can phase shift the sampling signal 610 by the phase offset $\hat{\phi}$ so that the third measurement is aligned with the peak of the capacitive sensing signal 315. Although method 700 illustrates determining the phase offset corresponding to a first electrode—i.e., sensor electrode 605—the process may be repeated using respective first and second measurements for other sensor electrodes (e.g., other capacitive nodes) in the sensing region to determine respective phase offsets relative to a modulated signal and the capacitive sensing signal for all the sensor electrodes or capacitive nodes.

At block 715, the receiver dithers a phase to generate an extrapolation error when generating a fourth measurement of the capacitive sensing signal 315. As mentioned above, the R, L, C values of each capacitive node may drift because of, e.g., temperature variations or because a input object is proximate to the node. Changing the R, L, C value changes the phase offset between the modulated signal and the capacitive sensing signal. Thus, the phase offset determined at block 710 may become stale or inaccurate over time which means using that phase offset to control when the sampler 615 samples the capacitive sensing signal 315 means the measurements are no longer aligned with peaks or valleys in the signal 315. One way of handling this drift in the phase offset is to repeat method 500 where two new measurements (with a phase difference of ninety degrees) are captured during two consecutive bursts or two consecutive capacitive frames. However, doing requires two bursts which can slow down or interrupt capacitive sensing.

Instead, by dithering the phase, the receiver can update the phase offset as the offset drifts so that repeating method 500 can be avoided (or at least delayed). In one embodiment, when generating the fourth measurement, the receiver 206 introduces a small variation or dithering of phase $\varepsilon_i(t)$ to either the modulated signal or the sampling signal 610. For example, the phase shifter 620 may change the phase offset provided by the phase offset module 630 by 1-5 degrees in order to dither the phase. That is, the receiver 206 intentionally applies a non-optimal phase offset to the sampling signal 610 which generates the extrapolation error. The amount of dithering between the samples can be varied vary depending on the accuracy of the phase offset estimate, which can be determined by comparing measured amplitudes of a signal. The closer in time to the initial phase offset calculation determined at block 705, the phase shifter 620 may use smaller dithering parameters (i.e., a smaller range and smaller step sizes between the samples). The phase shifter 620 may use larger dithering parameters (i.e., a larger range and larger step sizes) the further away in time from the initial phase offset calculation.

After generating the fourth measurement, the phase offset module 630 can calculate an updated phase offset $\tilde{\phi}_i(T)$ using the following:

$$\tilde{\phi}_i(T)=\text{argmax}_{t\in[T\text{-}history,T]}A_i(\varepsilon_i(t)) \quad (6)$$

The dithering function $\varepsilon_i(t)$ can be any periodic, symmetrical, zero mean function with an amplitude corresponding to a possible extrapolation of a phase. By tracking a history of the extrapolation error, the receiver can adjust the phase offset for each subsequent measurement and account for drifts in the phase offset between the modulated signal and the capacitive sensing signal over time. At block 720, the receiver updates the phase offset using the extrapolation error and dithering history. In this manner, the receiver 206 can delay or avoid having to repeat method 500 in FIG. 5 when the R, L, C values for any given capacitive node change.

In another embodiment, the phase shifter 620 can rely on dithering the phase to identify the initial phase offset between the capacitive sensing signal and the modulated signal. That is, instead of capturing two measurements as described above, the phase shifter 620 can capture multiple measurements while applying different phase shifts to either the modulated signal or the sampling signal between zero and ninety degrees to determine the initial estimate of the phase offset. In this example, method 500 would not be used. Once the initial phase offset is identified, the phase shifter 620 can use smaller phase shifts as described in block 715 to update the phase offset between the capacitive sensing signal and modulated signal over multiple samples.

At block 725, the receiver determines whether the change in phase determined at block 715 exceeds a threshold. That is, dithering the phase offset away from its optimal value may work if the R, L, C values do not change dramatically. However, if these values change quickly, dithering the phase as described above may not be sufficient to identify the new phase offset. If the threshold is exceeded, method 700 returns to block 505 of FIG. 5 and repeats method 500. That is, the receiver 206 captures two measurements with a ninety degree phase difference and again identifies the phase offset.

However, if the updated phase offset does not exceed the threshold—i.e., the phase offset changed a small amount or not at all—method 700 returns to block 715 where the receiver 206 can again generate another measurement of the capacitive sensing signal while dithering the phase offset. While the receiver 206 can dither the phase offset each time the capacitive node is sensed, in another embodiment, the receiver 206 may dither the phase offset for some capacitive sensing bursts but not for others. For example, the receiver 206 may dither the phase offset every other time the sampler 615 captures a measurement for the sensor electrode 605.

In one embodiment, the receiver 206 may be selectively coupled to multiple sensor electrodes. In such a case, the phase offset module 630 may calculate respective optimal phase offsets for each of the different sensor electrodes. Thus, the phase shifter 620 may apply a different phase shift to the sampling signal 610 depending on which sensor electrode 605 is currently generating the capacitive sensing signal 315. The respective phase offsets (and updated phase offsets calculated by dithering) can be stored in the receiver 206 or elsewhere in the processing system.

The embodiments and examples set forth herein were presented in order to best explain the embodiments in accordance with the present technology and its particular application and to thereby enable those skilled in the art to make and use the present technology. However, those skilled in the art will recognize that the foregoing description and examples have been presented for the purposes of illustration and example only. The description as set forth is not intended to be exhaustive or to limit the disclosure to the precise form disclosed.

In view of the foregoing, the scope of the present disclosure is determined by the claims that follow.

I claim:

1. An input device, comprising:
a plurality of sensor electrodes in a sensing region of the input device; and
a processing system coupled to the plurality of sensor electrodes, the processing system configured to:
generate a first measurement of a capacitive sensing signal acquired using a first sensor electrode of the plurality of sensor electrodes during a first time period, wherein the capacitive sensing signal comprises effects of a first modulated signal driven onto at least one of the plurality of sensor electrodes;
generate a second measurement of the capacitive sensing signal acquired using the first sensor electrode during a second time period, wherein a phase difference between the first and second measurements is ninety degrees; and
determine a phase offset between the capacitive sensing signal and the first modulated signal based on the first and second measurements; and
phase shift a sampling signal used to generate a third measurement of the capacitive sensing signal acquired using the first sensor electrode by the phase offset,
wherein phase shifting the sampling signal by the phase offset aligns the third measurement with a peak amplitude of the capacitive sensing signal, and
wherein the capacitive sensing signal has the same shape as the first modulated signal but with different corresponding amplitudes and phase delays.

2. The input device of claim 1, wherein the processing system is configured to, during the second time period:
phase shift a second sampling signal used to generate the second measurement by ninety degrees relative to a phase of a first sampling signal used to generate the first measurement during the first time period.

3. The input device of claim 1, wherein the processing system is configured to, during the second time period:
phase shift a second modulated signal by ninety degrees relative to a phase of the first modulated signal used during the first time period.

4. The input device of claim 1, wherein the first and second time periods correspond to one of: consecutive sensing bursts in a same capacitive sensing frame and consecutive capacitive sensing frames.

5. The input device of claim 1, wherein the processing system is configured to:
phase shift one of the sampling signal and the first modulated signal to identify an extrapolation error when generating a fourth measurement of the capacitive sensing signal acquired using the first sensor electrode during a third time period, wherein the third time period occurs after the first and second time periods; and
update the phase offset based on the extrapolation error.

6. The input device of claim 1, wherein the processing system includes continuous-time receiver for generating the first and second measurement, wherein the first modulated signal is not synchronized with a sampling signal used to determine when the receiver generates the first and second measurements.

7. A processing system, comprising:
sensor circuitry configured to drive a first modulated signal onto at least one of a plurality of sensor electrodes for capacitive sensing;
a receiver configured to:
generate a first measurement of a capacitive sensing signal acquired using a first sensor electrode of the plurality of sensor electrodes during a first time period, wherein the capacitive sensing signal comprises effects of the first modulated signal being driven onto the at least one sensor electrode;
generate a second measurement of the capacitive sensing signal acquired using the first sensor electrode during a second time period, wherein a phase difference between the first and second measurements is ninety degrees; and
determine a phase offset between the capacitive sensing signal and the first modulated signal based on the first and second measurements; and
phase shift a sampling signal used to generate a third measurement of the capacitive sensing signal acquired using the first sensor electrode by the phase offset, wherein phase shifting the sampling signal by the phase offset aligns the third measurement with a peak amplitude of the capacitive sensing signal, and wherein the capacitive sensing signal has the same shape as the first modulated signal but with different corresponding amplitudes and phase delays.

8. The processing system of claim 7, wherein the receiver is configured to, during the second time period:

phase shift a second sampling signal used to generate the second measurement by ninety degrees relative to a phase of a first sampling signal used to generate the first measurement during the first time period.

9. The processing system of claim 7, wherein the sensor circuitry is configured to, during the second time period:

phase shift a second modulated signal by ninety degrees relative to a phase of the first modulated signal used during the first time period.

10. The processing system of claim 7, wherein the first and second time periods correspond to one of: consecutive sensing bursts in a same capacitive sensing frame and consecutive capacitive sensing frames.

11. The processing system of claim 7, wherein the receiver is configured to:

phase shift the sampling signal to identify an extrapolation error when generating a fourth measurement of the capacitive sensing signal acquired using the first sensor electrode during a third time period, wherein the third time period occurs after the first and second time periods; and update the phase offset based on the extrapolation error.

12. The processing system of claim 7, wherein the receiver is a continuous-time receiver, wherein the first modulated signal is not synchronized with a sampling signal used to determine when the receiver generates the first and second measurements.

13. The processing system of claim 7, wherein the receiver is configured to:

generate a plurality of first measurements for each of the plurality of sensor electrodes when driving a plurality of modulated signals onto the plurality of sensor electrodes during the first time period;

generate a plurality of second measurements for each of the plurality of sensor electrodes during the second time period, wherein respective phase differences between the plurality of first and second measurements for each of the plurality of sensor electrodes is ninety degrees; and determine respective phase offsets between a plurality of sensing signals acquired using the plurality of sensor electrodes and the plurality of modulated signals based on the plurality of first and second measurements.

14. A method for performing capacitive sensing, the method comprising:

generating a first measurement of a capacitive sensing signal acquired using a first sensor electrode of a plurality of sensor electrodes during a first time period, wherein the capacitive sensing signal comprises effects of a first modulated signal driven onto at least one of the plurality of sensor electrodes;

generating a second measurement of the capacitive sensing signal acquired using the first sensor electrode during a second time period, wherein a phase difference between the first and second measurements is ninety degrees;

determining a phase offset between the capacitive sensing signal and the first modulated signal based on the first and second measurements; and phase shifting a sampling signal used to generate a third measurement of the capacitive sensing signal acquired using the first sensor electrode by the phase offset, wherein phase shifting the sampling signal by the phase offset aligns the third measurement with a peak amplitude of the capacitive sensing signal, and wherein the capacitive sensing signal has the same shape as the first modulated signal but with different corresponding amplitudes and phase delays.

15. The method of claim 14, further comprising:

phase shifting during the second time period a second sampling signal used to generate the second measurement by ninety degrees relative to a phase of a first sampling signal used to generate the first measurement during the first time period.

16. The method of claim 14, further comprising:

phase shifting during the second time period a second modulated signal by ninety degrees relative to a phase of the first modulated signal used during the first time period.

17. The method of claim 14, wherein the first and second time periods correspond to one of: consecutive sensing bursts in a same capacitive sensing frame and consecutive capacitive sensing frames.

* * * * *